Nov. 9, 1943. S. PAYNE 2,334,122
ELECTRIC COOKER
Filed March 10, 1941

Inventor
Dumas Payne
By
Atty.

Patented Nov. 9, 1943

2,334,122

UNITED STATES PATENT OFFICE 2,334,122

ELECTRIC COOKER

Sumas Payne, Chicago, Ill.

Application March 10, 1941, Serial No. 382,466

1 Claim. (Cl. 99—357)

This invention relates to cooking apparatus and more particularly to an electric cooker for frying bacon and eggs in a sanitary, efficient and practical manner. One object is to provide a cooker of this type that is readily portable, that is compact in assembly and that operates in such manner as to prevent the splattering of grease or the curling of the bacon strips during the cooking operation.

A further object is to provide a cooker of this type including means for draining the grease from the food being cooked, for absorbing and preventing the escape of fumes, odors therefrom and the like, which otherwise would pass into the room. A further object is to provide an electric cooker that is neat and attractive in appearance and durable in use.

With the foregoing and other objects in view the invention consists in the combination and arrangement of parts to be hereinafter fully described, pointed out in the claim and illustrated in the accompanying drawing which forms a part of this patent and in which—

Like reference characters denote corresponding parts throughout the several views.

Figure 1:
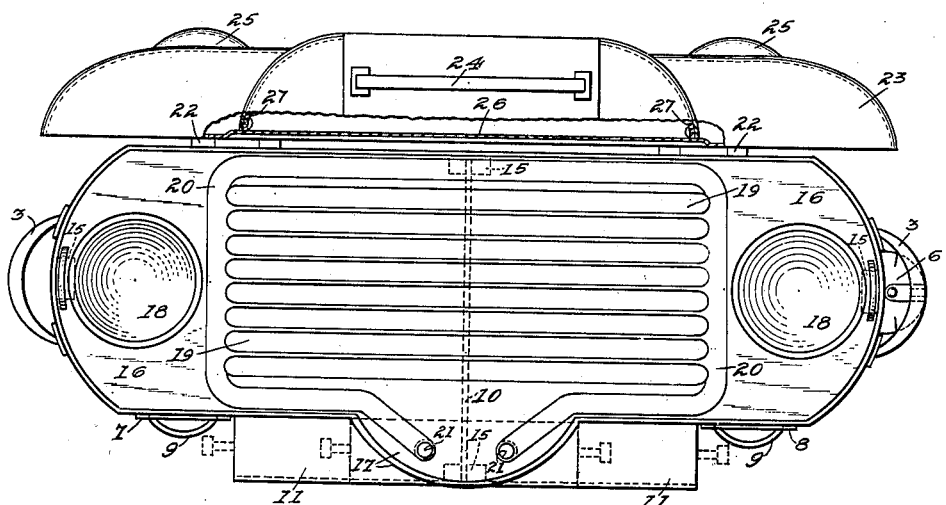
Fig. 1 is a top plan view of an electric cooker embodying the novel features of the present invention, the cover being shown in open or raised position.

The present cooker includes a hollow body portion 1 preferably of oblong shape, provided with a base 2 and with handles 3 at its ends. Extending longitudinally of the body at a point substantially centrally thereof is an horizontal partition 4 removably supported upon lugs 4 carried by the body walls, said partition dividing the body into interior compartments, upper and lower. Within the upper compartment is the electrical heating element preferably composed of a central portion adapted to heat that portion of the compartment between its ends, and the portion or portions adapted to heat the ends of the compartment, said heating element being provided with a three-way switch 6.

By means of said switch 6 the central portion of the heating element may be energized alone, or the end portions energized alone, or the complete element energized, selectively. Disposed in the compartment below the partition 4 are the drawers 7, 8 adapted to contain cooking utensils or the like, each being provided with a handle 9.

Figure 2:
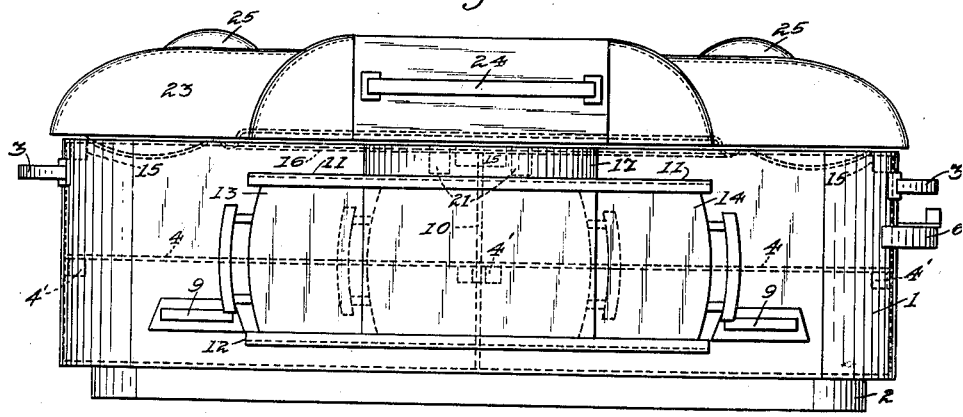
Fig. 2 is a view of Fig. 1 in front elevation but with the cover in closed position.
Figure 3:
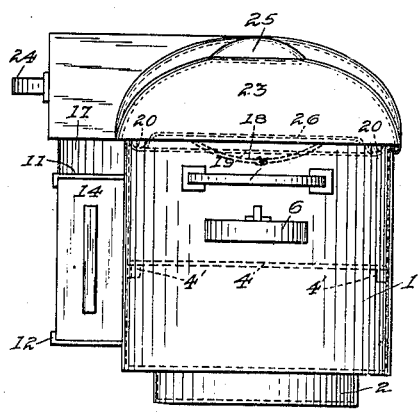
Fig. 3 is a view of the cooker in end elevation.

Disposed substantially at the longitudinal center of the body 1 is the vertical partition 10 passing through the partition 4 and dividing the lower compartment of the body into two portions. Extending laterally from the front face of the body 1 and extending longitudinally thereof are an upper guide rail 11 having a downturned free outer longitudinal edge and a bottom guide rail 12 formed with an upturned terminal edge or lip. Slidably received between said upper and lower rails and the edges thereof are the grease containers 13, 14 preferably formed with partly closed tops which tops are removable to permit cleaning, said tops having a pouring and receiving orifice. In one position of the containers, shown in full lines in Fig. 2, they are ready for removal from the rails to permit evacuation of their contents. In a second position, shown in dotted lines, they are in receiving position to permit filling or receiving of grease from the cooker.

Removably received upon the body 1 and supported upon lugs 15 carried by the wall thereof and normally forming a closure therefor is the one-piece griddle 16 formed upon its forward edge with a somewhat dish-shaped apron 17 that extends over part of the top rail 11 and that is formed at its ends with shallow wells 18, 18 preferably substantially circular in shape, the central griddle portion being fluted longitudinally to form a grille 19, said grille being surrounded by a depression 20 forming a grease trough that passes between the grille and said wells 18, the ends thereof terminating in the apron 17 and being perforated to form a grease drain, said perforations being disposed in line with the container orifices in the inwardly disposed position of said containers, lips 21 depending from said apron being then contiguous to the container-top perforations to direct the grease thereinto.

Secured to the body by hinges 22 is a cover 23 having a handle 24, the ends of said cover being hollow to form smoke chambers in the topmost portions of which domes 25 are formed that contain an activated-carbon deodorizer, that portion of the cover between its hollow ends being formed with a grille plate 26 formed with screw-receiving perforations to receive screws whereby it is removably secured to lugs 27 carried by the cover, said grille being complementary to the grille 19 between which members, when the cover is closed, the bacon is disposed and fried, the grilles marking or fluting the bacon as it cooks. One or more slices of bacon may be disposed upon the grille 19 for frying.

One or more eggs may be disposed within the egg cooking or frying portions 18. After the bacon is in place and the cover closed that portion of the heating element beneath the grille is energized to permit the bacon to partially cook and at a predetermined time the eggs are placed in position and the complete heating element energized thus causing the bacon and eggs to cook at the same time. By means of the switch the egg compartments may be heated without heating the grilles when eggs alone are being fried. A thermostat or time switch of well known construction, neither being shown, may be provided if desired to automatically shut off the electrical current at a predetermined time to prevent scorching or burning of the food being cooked.

It is, of course, understood that three separate switches, one for each compartment, may be provided so that the egg containers may be heated separately as well as the bacon grille.

What is claimed is:

In an electrical cooker of the portable type, a body, a cover hinged thereto, the ends of said cover being hollow to form smoke chambers, spheral domes formed in said chambers, activated-carbon deodorizers in said domes, a griddle arranged upon said body and having a central fluted grille and wells in its ends and a fluted grille carried by said cover complementary to and for cooperation with said first named grille.

SUMAS PAYNE.